United States Patent [19]

Oosterling et al.

[11] 4,126,089
[45] Nov. 21, 1978

[54] DEVICE FOR COMPRESSING CROP INTO BALES

[75] Inventors: Pieter A. Oosterling, Nieuw-Vennep; Adriaan Van Zweeden, Rijsenhout, both of Netherlands

[73] Assignee: Expert N.V., Willemstad, Netherlands Antilles

[21] Appl. No.: 811,178

[22] Filed: Jun. 29, 1977

[30] Foreign Application Priority Data

Jun. 30, 1976 [NL] Netherlands .......................... 7607222

[51] Int. Cl.[2] .......................... B30B 1/08; B30B 9/30
[52] U.S. Cl. ...................................... 100/250; 56/344; 292/216
[58] Field of Search ............... 100/255, 179, 218, 250, 100/97, 98, 137, 138, 141, 142, 269 R, 188, 189, 215, 45, 232, 233; 56/341, 343, 344; 292/201, 216; 49/394

[56] References Cited

U.S. PATENT DOCUMENTS

| | | | |
|---|---|---|---|
| 1,815,724 | 7/1931 | Otis | 292/216 X |
| 2,552,888 | 5/1951 | Druetta | 100/100 X |
| 2,931,231 | 4/1960 | Felix | 292/216 X |
| 3,149,582 | 9/1964 | Madland | 292/216 X |
| 3,986,845 | 10/1976 | Hotchkiss | 100/250 X |

FOREIGN PATENT DOCUMENTS 2,253,468  7/1975  France ....................................... 100/250

*Primary Examiner*—Billy J. Wilhite
*Attorney, Agent, or Firm*—Snyder, Brown & Ramik

[57] ABSTRACT

A device for compressing crop into bales comprising a compression chamber having an inlet opening and a pressing member adapted to reciprocate along said opening and feeder mechanism for introducing the crop through the inlet opening into the compression chamber, which device is intended for making bales having a high specific weight; the device is able to be operated continuously.

9 Claims, 2 Drawing Figures

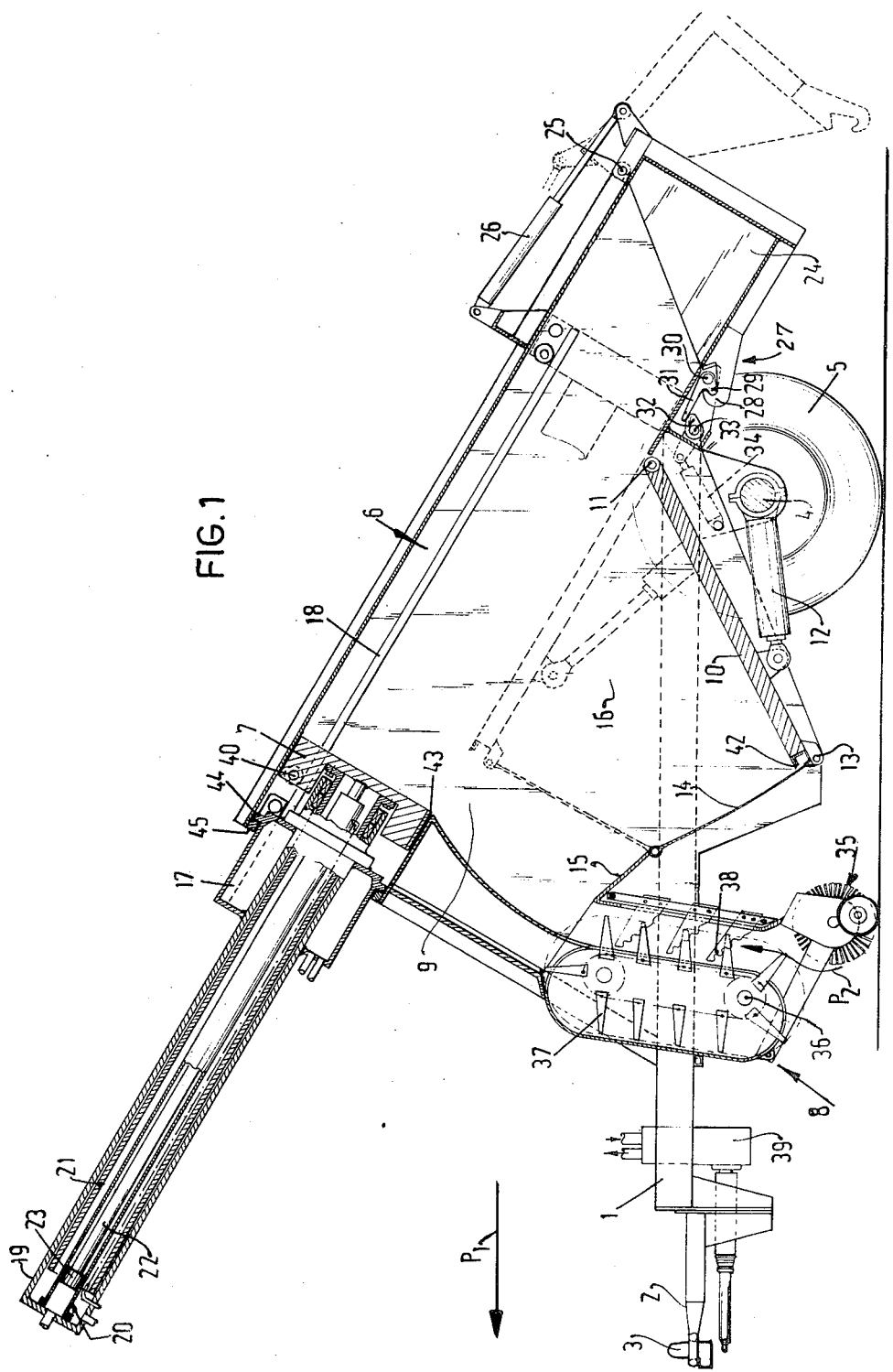

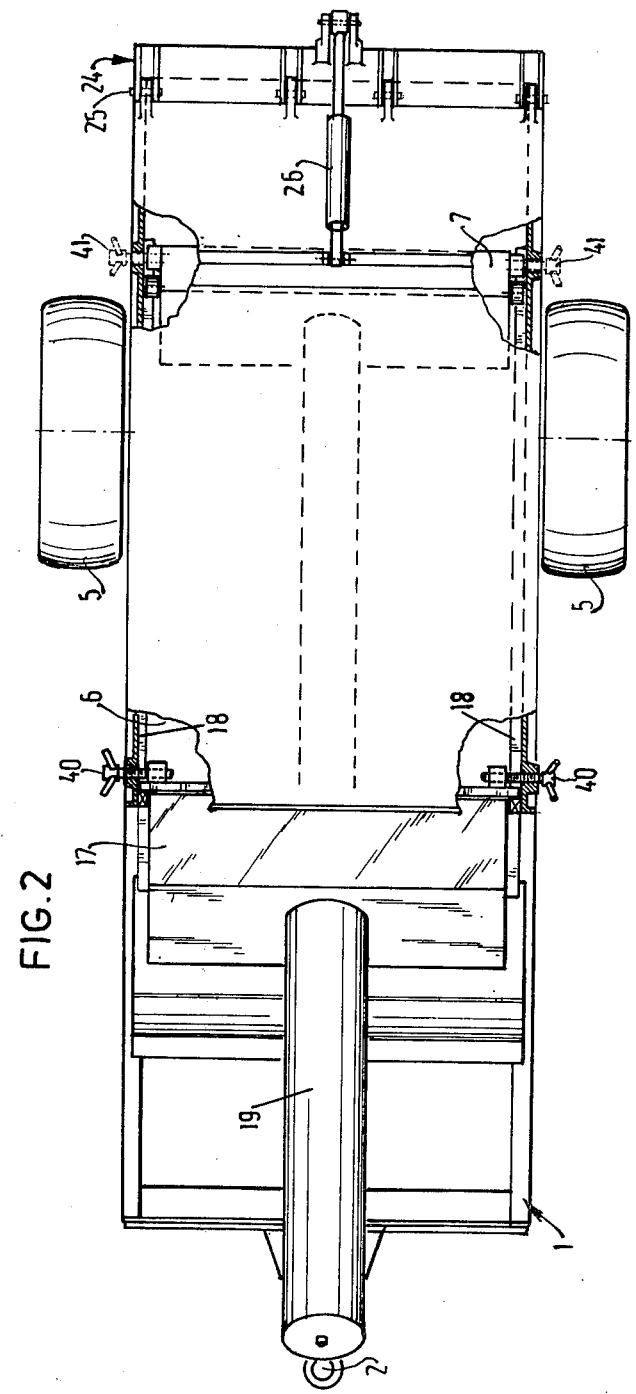

DEVICE FOR COMPRESSING CROP INTO BALES

The invention relates to a device for compressing crop into bales comprising a compression member having an inlet opening and a pressing member adapted to reciprocate along said opening and a feeder mechanism for introducing the crop through the inlet opening into the compression chamber.

A device of the kind set forth is particularly intended for making bales having a high "specific weight", which means that a large quantity of crop introduced into the compression chamber can be compressed into a bale by a single stroke of the pressing member.

The object of the invention is to improve the end portion comprising the discharge or outlet opening of the compression chamber, which end portion is suitable to withstand high compression forces.

In accordance with the invention the end portion of the compression chamber, where the compressed bale is located, is adapted to pivot about a shaft extending transversely of the direction of compression so that the compressed bale can be readily discharged.

Further features and advantages of the invention will be apparent from the following description of the Figures showing an embodiment. In the drawing:

FIG. 1 is a standing sectional view of a drawn, mobile baling device,

FIG. 2 is a plan view of the device shown in FIG. 1.

The device shown in the Figures is suitable for being drawn by any vehicle in the direction of the arrow P1. The frame 1 of the device is provided for this purpose with a draw eyelet 2 receiving the drawhook 3 of the vehicle. The frame 1 is provided on the rear side with an axle 4 having ground wheels 5 at its ends.

The baling device carried by the frame 1 mainly comprises a compression chamber 6, a compressing plunger 7 adapted to reciprocate in the direction of length of the compression chamber and a feeder mechanism 8, which picks up the crop from the ground and elevates it to the auxiliary space 16.

The bottom of the compression chamber 6 is partly pivotable. This pivotable portion is designated by 10 and it is pivotable up and down about an axis transverse of the direction of compression 11 by means of a piston-cylinder mechanism 12. FIG. 1 shows the bottom portion 10 in the tilted down position by solid lines and in the tilted up position by broken lines. The end 13 of the bottom portion 10 remote from the pivotal shaft 11 is connected through a flexible element 14 with a wall portion 15 of the feeder mechanism 8.

The auxiliary space 16 according to the main feature of this invention for the temporary storage of the crop is bounded in the embodiment shown in FIG. 1 by the bottom wall portion 10 and the flexible element 14 indicated by broken lines in the bottom side. The sidewalls of the auxiliary space 16 register with those of the compression chamber 6.

The plunger 7 is supported in a carrier 17, which is adapted to slide like the plunger 7 in the direction of length of the compression chamber 6. A correct guiding of the plunger 7 as well as of the carrier 17 is ensured by a rail 18 arranged on the inner sides of the two sidewalls of the compression chamber 6.

The hydraulic cylinder for the reciprocatory movement of the plunger 7 and the carrier 17 is a two-stage cylinder in the embodiment shown. The cylinder comprises for this purpose an outer cylinder 19 and a cylinder 20 arranged at the bottom of the former. The plunger 7 is, therefore, provided with a cylindrical plunger rod 21 co-operating with the outer cylinder 19 and with a plunger rod 22 cooperating with the inner cylinder 20.

The outermost plunger rod 21 as well as the innermost 22 are fastened to the plunger 7. This double structure serves to attain a sufficiently high speed of the plunger 7 at the beginning of the compression stroke and to obtain a sufficiently high pressing force at the end of the compression stroke. For this purpose the fluid will in the first instance be fed to the inner cylinder 20 so that at a given fluid displacement a comparatively high speed of the plunger 7 is obtained. By a pressure dependent valve of known type (not shown) the fluid supply will be transferred, at a given counter-pressure on the plunger 7, to the outer cylinder 19 so that with the same fluid displacement an appreciably higher pressing force, but a smaller shift in place be imparted to the plunger 7. On the other hand the return stroke of the plunger 7 will only be achieved by a fluid supply to the other side of the piston 23 fastened to the plunger rod 22 in the cylinder 20 so that this return stroke can be performed comparatively rapidly.

In the embodiment shown the support 17 is constructed in the form of a fluid sump for the cylinders 19 and 20 so that the fluid conduits are considerably shortened.

At the end remote from the inlet opening 9 the compression chamber 6 is provided with a pivotable part 24, which is adapted to pivot about a shaft 25 extending transversely of the direction of compression. The pivotal movement is performed by means of a piston-cylinder system 26 on the top side of the compression chamber 6 so that the pivotable part 24 can be turned from the closed position indicated by solid lines into the open position indcated by broken lines.

The pivotable part 24 can be locked in position by locking means 27 on the lower side of the compression chamber 6. These locking means 27 comprise a plurality of hook-like members 28 fastened to the pivotable part 24, a cam 29 joining the hook. The cam 29 is adapted to turn about a shaft 30, fastened to the bottom wall of the compression chamber 6. The cam 29 is provided with a control-arm 31, which is locked at its free end by a second cam 32. The number of cams 32 is, of course, equal to the number of cams 29 and of the hook-like members 28. The cams 32 are fastened to a common shaft 33, which is rotatably journalled with respect to the compression chamber 6 and which can be turned by means of a piston-cylinder system 34.

The pressing device according to the invention may be provided with any feeder mechanism 8. The embodiment shown comprises a pick-up member 35, which elevates the crop from the ground to an elevator 36 formed by an endless element passing around two reversing wheels, said elements being provided with projecting catches 37. The direction of rotation of the elevator is such that the catches 37 shown on the right-hand side in FIG. 1 move upwardly in the elevator channel.

The elevator members 37 may be constructed in the form of rakes, whilst in the elevator channel stationary cutting elements 38 may be provided, which extend between the tines of the rake-shaped member 37 during the rising movement of the elements 37. Thus the crop is cut to size.

The side 13 of the bottom wall portion 10 is provided with a knife-shaped peripheral part 42. Together with a knife-shaped peripheral part 43 fastened to the bottom side of the plunger 7 a scissor effect is obtained when the bottom 10 is in the tilted-up position and the plunger moves along the inlet opening 9 at the initiation of the compression. Thus long stems are cut. It is advisable to lock the bottom wall portion 10 in the tilted-up position in order to ensure a satisfactory scissor-effect.

The device depicted above operates as follows:

The position shown in FIG. 1 is the starting position prior to the pressing operation. When the device moves in the direction of the arrow P1, the crop will be moved by the pick-up member 35 in the direction of the arrow P2 into the elevator channel of the elevator mechanism 8, where it is engaged by the catches 37 and where it is cut to size, when the knife-shaped members 38 are provided. Subsequently the crop enters the space bounded by the wall 15, the flexible element 14, the tilted-down bottom portion 10 and the sidewalls and the top wall of the compression chamber 6. The introduction of crop is continued until a predetermined quantity and/of density and/or weight is attained, at which instant the bottom portion 10 is urged upwards by the cylinder 12 into the position indicated by broken lines in FIG. 1. This movement produces a first densification of the crop. Locking of the part 24 is designed so that it is performed fully automatically and with great reliability. When the part 24 is turned into the closing position by means of the cylinder 26, the hooks 28 first exert pressure on the levers 31, which thus turn in the clockwise direction. The locking cam 29 already engages the hook. Finally the levers 31 are locked in position by the cams 32.

Subsequently the two-stage cylinder 19, 20 will become operative, as a result of which the plunger 7 moves first rapidly and then slowly but with a high pressing force into the position indicated by the broken lines in FIG. 1. In order to obtain a still higher degree of filling prior to the compression the bottom portion 10 might be moved up and down several times so that a still larger quantity of crop can be stowed in the lower part of the compression chamber 6 on the right-hand side in FIG. 1. The entire position of the compression chamber 6 is appropriate for such an operation, since the crop moves downwards by gravity.

After the compression a bale of crop is obtained whose dimensions are determined by the remaining volume of the compression chamber 6. After the bale has been bound by binders of any type (not shown), the part 24 of the compression chamber can first be unlocked by turning the locking cam 32 in clockwise direction by means of the cylinder 34 so that the lever 31 is released and will turn in anti-clockwise direction. Owing to this movement the cam 29 drops out of the hook 28 so that the part 24 will swing open by its own weight, which movement can continue to the position indicated by the broken lines in FIG. 1, which position is reached by energizing the cylinder 26. The compressed bale will then drop onto the ground.

During the pressing operation the crop can be continuously picked up by means of the pick-up member 35, since in the first instance the crop enters the space located above the elevator channel of the elevator mechanism 8 and subsequently the space behind the plunger 7, when it is in its lowermost position. At this instant the bottom portion 10 again moves downwards so that the whole quantity of crop contained in the space behind the plunger 7 enters the auxiliary space 16.

After the compressed bale has been bound it is discharged by opening the part 24. At the same time the plunger 7 is withdrawn with high speed into the topmost position. Immediately after the discharge of the bale part 24 is closed. The device is then ready for compressing a new bale.

It will be obvious that the successive actuation of the various cylinders of the device may be completely performed by programming. The cylinders may be fed from one centre by means of a fluid pump 39 driven by the traction vehicle, whilst various time-controlled valves (not shown) regulate the energization of the various cylinders.

The position shown in FIG. 1 is that in which the device is suitable for the continuous compression of bales of crop on the field. If the device has to be transported on the road, the whole plunger 7 with the cylinders 19 and 20 as well as the sump 17 can be sunk into the compression chamber 6, to which end first the plunger 7 is moved down into the position indicated by the broken line. Subsequently the lock bolts 40 on either side of the compression chamber 6 are unlocked (see FIG. 2), the plunger 7 is locked by means of the lock bolts 41 and during the ascending plunger movement the unit 17 will be drawn into the compression chamber.

The return to the operative position is performed in the reverse sense. The required reaction force for the compressing force is absorbed by a flange 44 secured to the support 17 and engaging an inwardly extending rim 45 of the compression chamber.

Within the scope of the invention other embodiments may be designed. For example, the auxiliary chamber 16 need not be arranged beneath the compression chamber 6; the auxiliary space 16 may as well be disposed at the side of the chamber 6 or on the top side.

The flexible element 14 need not be elastic, it may be constructed in the form of a slide. Moreover, the hydraulic cylinders may be replaced by any other driving system.

What is claimed is:

1. A device for compressing crop into bales, comprising in combination:
    an elongate and horizontally extending compressing chamber having a discharge end portion within which a compressed bale is formed;
    crop compressing means for compressing crop within said chamber into said discharge end portion;
    means for feeding crop into said chamber to be compressed by said compressing means;
    said discharge end portion being formed in part as a swingable end closure whereby a compressed bale may be discharged by virtue of its own weight, said end closure including a transverse end wall and a generally horizontal bottom wall;
    pivot means pivotally connecting said end closure to said compressing chamber about a transverse pivot axis whereby said bottom wall is swingable from its generally horizontal position to a downwardly inclined position; and
    means for releasably latching said end closure in end closing position.

2. A device as defined in claim 1 wherein said end closure also includes opposite side wall portions joining said transverse end wall and said bottom wall thereof.

3. A device as defined in claim 2 wherein said opposite side walls of the end closure are of triangular shape.

4. A device as defined in claim 2 wherein said end portion of the compressing chamber includes a top wall and depending side walls, said opposite side wall portions of the end closure forming extensions of said side walls of the compressing chamber.

5. A device as defined in claim 4 wherein said depending side walls terminate in end edges which slope downwardly and away from said end wall of the end closure and said side wall portions of the end closure are triangular so as to abut said end eges.

6. A device as defined in claim 1 wherein said means for releasably latching comprises a plurality of hook-like members on said end closure and cams rotatably carried by said compressing chamber and cooperating with said hook-like members.

7. A device as defined in claim 6 wherein each of said cams is provided with a lever projecting therefrom.

8. A device as defined in claim 7 wherein said means for releasably latching also includes second cams engaging said levers.

9. A device as defined in claim 8 wherein said second cams are mounted on a common shaft rotatably carried by said compression chamber.

* * * * *